(12) United States Patent
Tsuchiya

(10) Patent No.: US 9,042,771 B2
(45) Date of Patent: May 26, 2015

(54) ATTACHMENT STRUCTURE FOR OPERATION UNIT AND IMAGE FORMING APPARATUS

(71) Applicant: KYOCERA Document Solutions Inc., Chuo-ku, Osaka-shi (JP)

(72) Inventor: Hiroaki Tsuchiya, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 92 days.

(21) Appl. No.: 13/660,807

(22) Filed: Oct. 25, 2012

(65) Prior Publication Data

US 2013/0108317 A1 May 2, 2013

(30) Foreign Application Priority Data

Oct. 27, 2011 (JP) ................................. 2011-236093

(51) Int. Cl.
*G03G 15/00* (2006.01)
*H04N 1/00* (2006.01)

(52) U.S. Cl.
CPC ......... *H04N 1/0035* (2013.01); *H04N 1/00384* (2013.01); *G03G 15/50* (2013.01)

(58) Field of Classification Search
CPC .. H04N 1/00384; H04N 1/0035; G03G 15/50
USPC ................................................. 399/110, 411
See application file for complete search history.

(56) References Cited

U.S. PATENT DOCUMENTS

| 7,129,433 | B2 * | 10/2006 | Tokusashi | 200/344 |
| 7,266,325 | B2 * | 9/2007 | Hirose et al. | 399/107 |
| 7,564,002 | B2 * | 7/2009 | Watanabe | 200/344 |
| 8,232,493 | B2 * | 7/2012 | Ichikawa et al. | 200/341 |
| 2006/0226745 | A1 * | 10/2006 | Kimura | 312/293.1 |

FOREIGN PATENT DOCUMENTS

| CN | 101026894 A | 8/2007 |
| JP | S58-117759 | 7/1983 |
| JP | H10-334761 | 12/1998 |
| JP | H11-306903 | 11/1999 |

(Continued)

OTHER PUBLICATIONS

Notice of Reasons for Rejection for Japanese Application No. 2011-236093, mailed Oct. 29, 2013.

(Continued)

*Primary Examiner* — David Gray
*Assistant Examiner* — Carla Therrien
(74) *Attorney, Agent, or Firm* — Pearl Cohen Zedek Latzer Baratz LLP

(57) ABSTRACT

An attachment structure for operation panel unit includes an operation panel unit 16 with keys 20a to 20c operated by a user, a main body 2 to which the operation panel unit 16 is attached and an outer covering 6 that is attached to the main body 2 so as to cover the operation panel unit 16. The operation panel unit 16 is attached to the main body 2 in such a way that the operation panel unit 16 can slide with respect to the main body 2, in a direction intersecting an attaching direction of the outer covering 6 to the main body 2. When the outer covering 6 is attached to the main body 2 in a state in which the operation panel unit 16 is attached to the main body 2, sliding of the operation panel unit 16 is restricted.

8 Claims, 7 Drawing Sheets

(56) References Cited

FOREIGN PATENT DOCUMENTS

| | | |
|---|---|---|
| JP | 2005-217327 | 11/2005 |
| JP | 2011-086516 | 4/2011 |

OTHER PUBLICATIONS

Office Action issued regarding CN Application No. 201210402873.6, mailed Dec. 29, 2014.

* cited by examiner

ATTACHMENT STRUCTURE FOR OPERATION UNIT AND IMAGE FORMING APPARATUS

CROSS-REFERENCE TO RELATED APPLICATIONS

This application is based on and claims the benefit of priority from Japanese Patent Application No. 2011-236093, filed on 27 Oct. 2011, the content of which is incorporated herein by reference.

BACKGROUND OF THE INVENTION

The present disclosure relates to an attachment structure for attaching an operation panel unit with a key to a main body, and an image forming apparatus provided therewith.

Conventionally, in an electronic device such as an image forming apparatus, an operation panel unit with a key is attached to a main body. Various functions of the electronic device are executed by a user operating the key.

In addition, the operation panel unit is generally covered by an outer covering with a key hole at a position corresponding to the key. On the operation panel unit, only the key is exposed through the key hole.

For assembling of such an electronic device, a structure in which the operation panel unit is first attached to the main body then the outer covering is attached to the main body (hereinafter referred to as "first structure") and a structure in which the operation panel unit is first attached to the outer covering and then the outer covering is attached to the main body (hereinafter referred to as "second structure") are known.

In a case of employing the first structure, the operation panel unit and the outer covering are indirectly connected to each other through the main body. Therefore, it is difficult to obtain a high positional accuracy for the key on the outer covering. Given this, it is necessary to set a sufficient clearance between the key hole on the outer covering and the key. Accordingly, the key becomes loose and operability thereof deteriorates.

On the other hand, in the second structure, the operation panel unit is directly attached to the outer covering. Therefore, it is easy to obtain a high positional accuracy for the key on the outer covering. However, in the second structure, wiring between the operation panel unit and an electrical component on the main body side and the like can only be performed after attaching the outer covering, to which the operation panel unit is attached, to the main body. Therefore, wiring becomes extremely difficult in a case in which a wiring portion is covered by the outer covering.

SUMMARY OF THE INVENTION

An attachment structure for operation panel unit according to the present disclosure includes an operation panel unit, a main body to which the operation panel unit is attached and an outer covering that is attached to the main body so as to cover the operation panel unit. The operation panel unit is provided with a key operated by a user. The operation panel unit is attached to the main body in such a way that the operation panel unit can slide with respect to the main body, in a direction intersecting an attaching direction of the outer covering to the main body. When the outer covering is attached to the main body in a state in which the operation panel unit is attached to the main body, sliding of the operation panel unit is restricted.

An image forming apparatus according to the present disclosure includes the abovementioned attachment structure for operation panel unit.

DETAILED DESCRIPTION OF THE INVENTION

Figure 1:
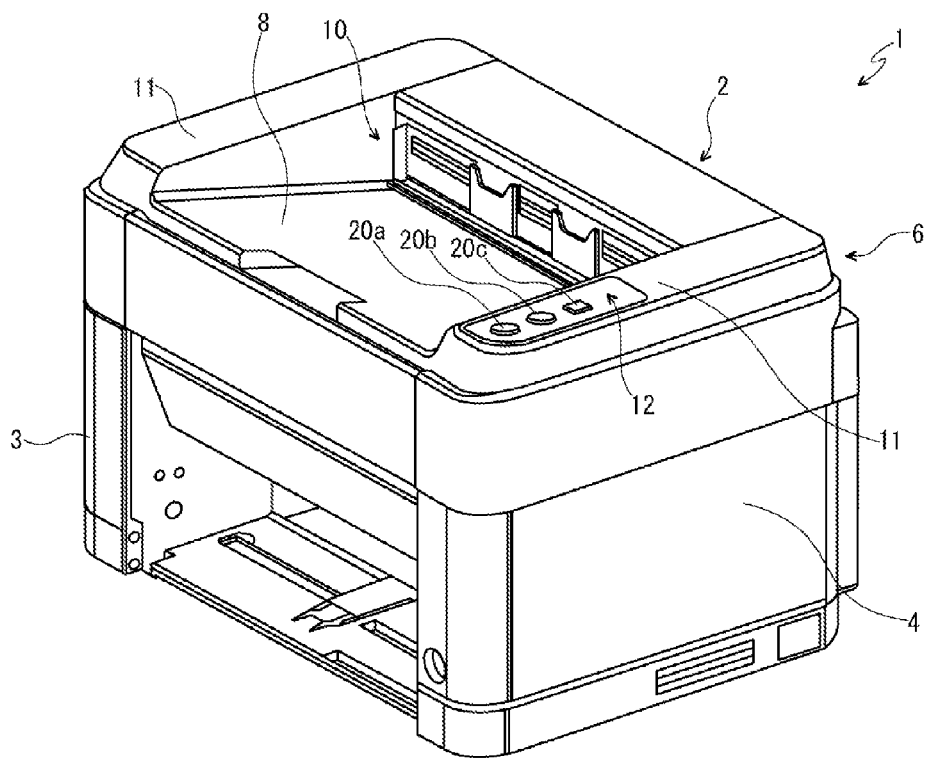
FIG. 1 is a perspective view of a printer according to an embodiment of the present disclosure.
Figure 2:
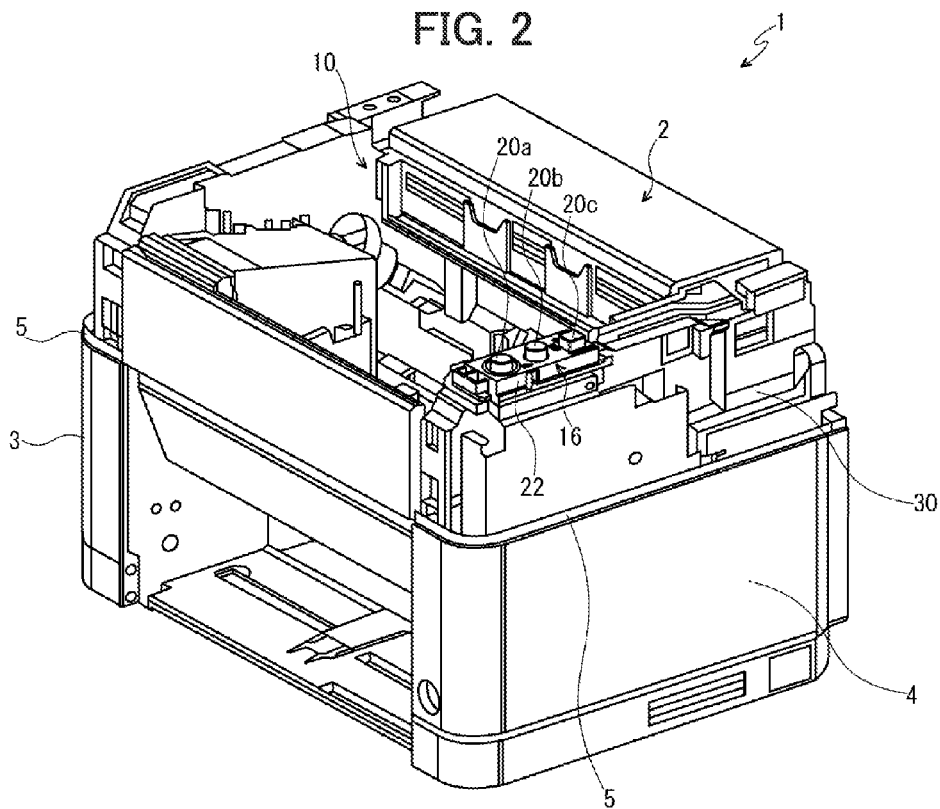
FIG. 2 is a perspective view of the printer according to the embodiment of the present disclosure in a state in which an upper covering is removed.
Figure 3:
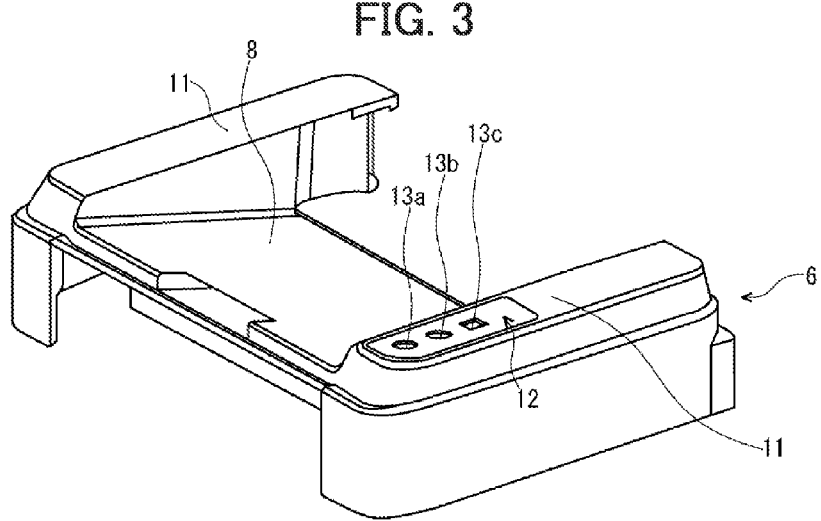
FIG. 3 is a perspective view of the upper covering of the printer according to the embodiment of the present disclosure.
Figure 4:
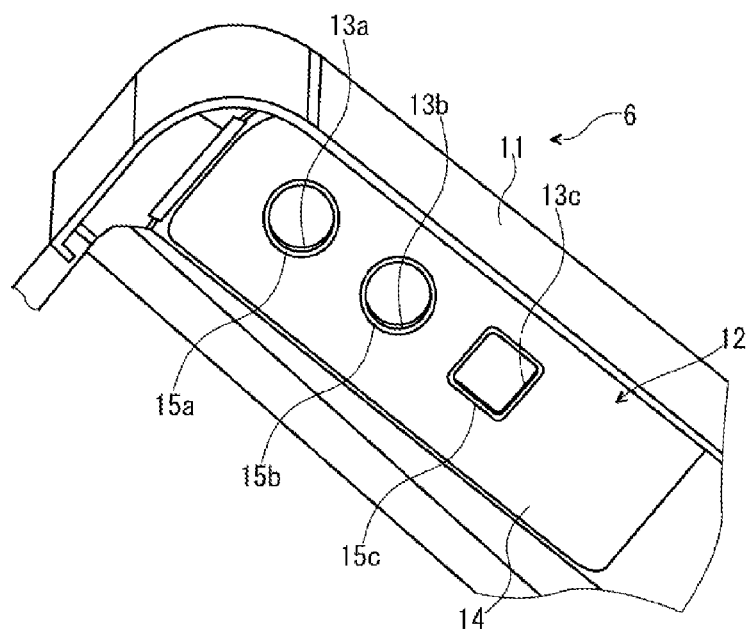
FIG. 4 is a perspective view taken from below, showing the vicinity of a right front part of the upper covering of the printer according to the embodiment of the present disclosure.
Figure 5:
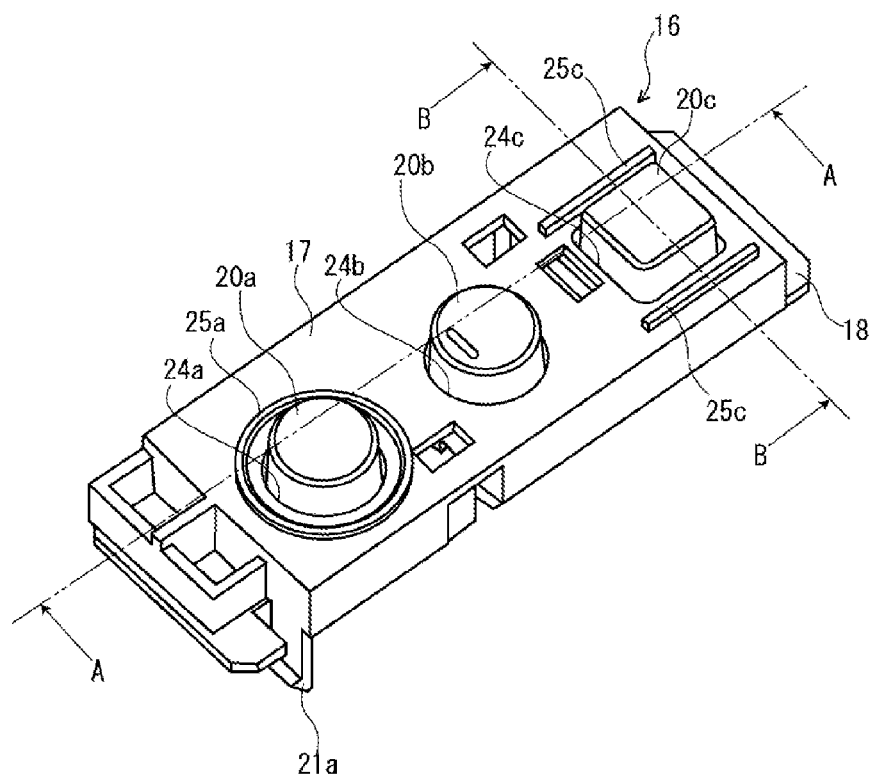
FIG. 5 is a perspective view of an operation panel unit of the printer according to the embodiment of the present disclosure.
Figure 6:
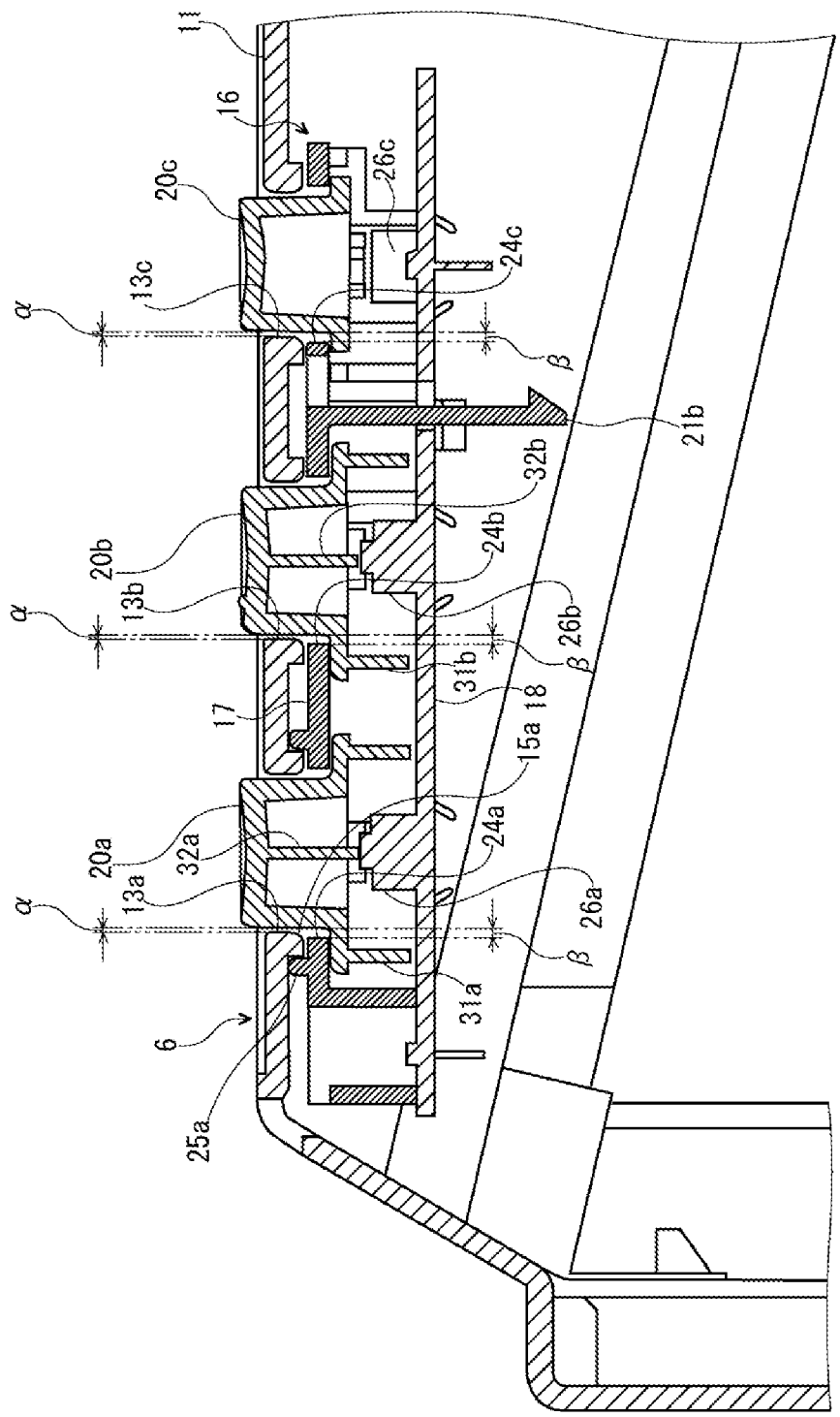
FIG. 6 is a cross-sectional view of the upper covering and the operation panel unit taken along the line A-A in FIG. 5.
Figure 7:
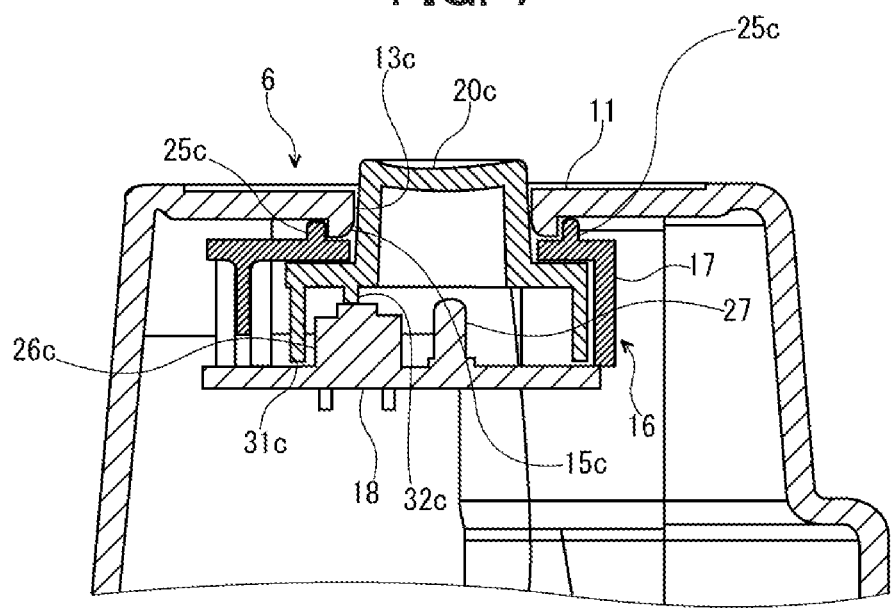
FIG. 7 is a cross-sectional view of the upper covering and the operation panel unit taken along the line B-B in FIG. 5.
Figure 8:
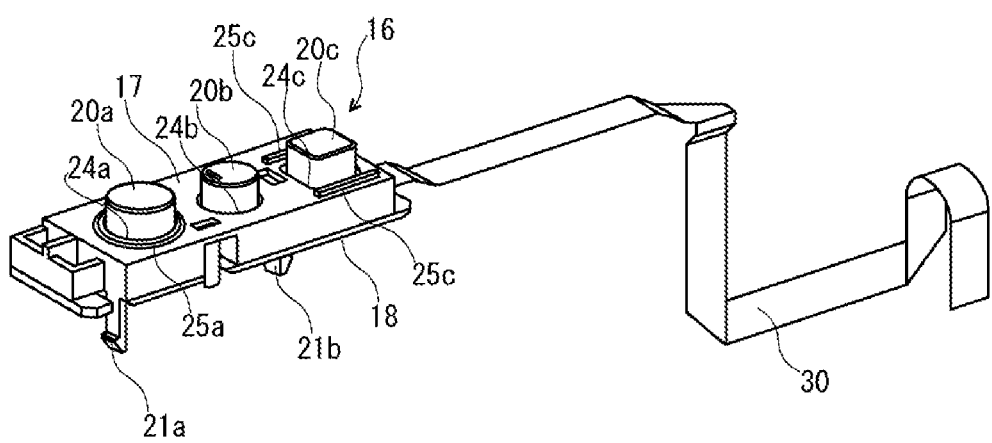
FIG. 8 is a perspective view of the operation panel unit and a flat cable of the printer according to the embodiment of the present disclosure.
Figure 9:
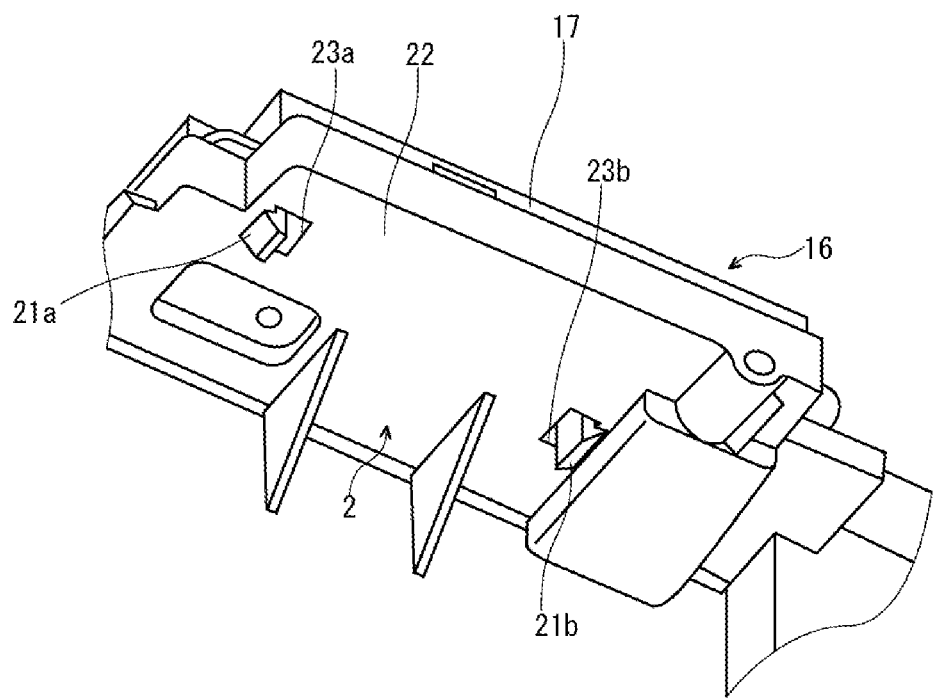
FIG. 9 is a perspective view taken from below, showing a main body frame, to which the operation panel unit is attached, of the printer according to the embodiment of the present disclosure.

A printer 1 as the image forming apparatus according to an embodiment of the present disclosure is described hereinafter with reference to FIGS. 1 to 9. FIG. 1 is a perspective view of a printer according to an embodiment of the present disclosure. FIG. 2 is a perspective view of the printer according to the embodiment of the present disclosure in a state in which an upper covering is removed. FIG. 3 is a perspective view of the upper covering of the printer according to the embodiment of the present disclosure. FIG. 4 is a perspective view taken from below, showing the vicinity of a right front part of the upper covering of the printer according to the embodiment of the present disclosure. FIG. 5 is a perspective view of an operation panel unit of the printer according to the embodiment of the present disclosure. FIG. 6 is a cross-sectional view of the upper covering and the operation panel unit taken along the line A-A in FIG. 5. FIG. 7 is a cross-sectional view of the upper covering and the operation panel unit taken along the line B-B in FIG. 5. FIG. 8 is a perspective view of the operation panel unit and a flat cable of the printer according to the embodiment of the present disclosure. FIG. 9 is a perspective view taken from below, showing a main body frame, to which the operation panel unit is attached, of the printer according to the embodiment of the present disclosure. As used herein, a face directed to the left in FIG. 1 is referred to as a front side, for the sake of description.

As shown in FIG. 1, the printer 1 has a cuboidal printer main body 2. A left covering 3 and a right covering 4 (hereinafter referred to as "left and right coverings 3, 4") are attached to both side faces of the printer main body 2. An upper covering 6 as the outer covering is attached to an upper face of the printer main body 2.

An insertion projection 5 is provided respectively on an upper edge of the left and right coverings 3, 4 (see FIG. 2). While the left and right coverings 3, 4 are attached to both side faces of the printer main body 2, the upper covering 6 is attached to the printer main body 2 from above. The insertion projection 5 of the left and right coverings 3, 4 is inserted to the inside of a lower edge of the upper covering 6, to thereby restrict attachment and detachment of the left and right coverings 3, 4 with respect to the printer main body 2.

The upper covering 6 is attached to an upper portion of the printer main body 2 by way of a pair of screws (not illustrated) on the left and right sides, to thereby restrict attachment and detachment of the upper covering 6 with respect to the printer main body 2.

A paper ejection tray 8 that is inclined downward from a front side toward a rear side is provided on the upper face of the upper covering 6. A paper ejection unit 10 is provided in the printer main body 2, behind the paper ejection tray 8. The paper onto which a toner image is transferred and fused inside the printer main body 2 is ejected to the paper ejection tray 8 via the paper ejection unit 10.

As shown in FIG. 3, a projection 11 is provided on the upper covering 6, on both sides of the paper ejection tray 8. A through hole portion 12 extending in a front-back direction is provided on a front side of the upper face of the projection 11 on the right side. In the through hole portion 12, three covering side key holes 13a to 13c having vertical axis are provided therethrough. The covering side key holes 13a to 13c are arrayed in the front-back direction at predetermined intervals. The foremost covering side key hole 13a and the middle covering side key hole 13b are formed in a circular shape in a plan view. The rearmost covering side key hole 13c is formed in a rectangular shape in a plan view. As shown in FIG. 4, on a lower face 14 of the through hole portion 12, an annular-shaped fitting projection 15a as the covering side engaging portion is provided around the foremost covering side key hole 13a. An annular-shaped projection 15b is provided around the middle covering side key hole 13b. A square frame-shaped fitting projection 15c as the covering side engaging portion is provided around the rearmost covering side key hole 13c.

As shown in FIG. 2, in a front side of an upper right end of the printer main body 2, an operation panel unit 16 is provided at a position covered by the right side projection 11 of the upper covering 6. As shown in FIGS. 5 to 7, the operation panel unit 16 includes: an operation panel frame 17; a substrate 18 that covers a lower face of the operation panel frame 17; and three keys 20a to 20c that are attached to the operation panel frame 17.

As shown in FIG. 8, hooks (operation panel side attachment portion) 21a, 21b extending downward are provided on a right front end and a rear portion of the operation panel frame 17. The hook 21a on the right front end faces the front and the hook 21b on the rear portion faces the rear. As shown in FIG. 9, the hooks 21a, 21b are engaged with engaging holes 23a, 23b (main body side attachment portion) provided on a main body frame 22 constituting a part of the printer main body 2. A width in the depth direction and a width in a transverse direction of the engaging holes 23a, 23b are greater than those of the hooks 21a, 21b.

As shown in FIG. 5, on the operation panel frame 17, operation panel side key holes 24a to 24c having vertical axis are provided therethrough. The operation panel side key holes 24a to 24c are arrayed in the front-back direction at predetermined intervals. The foremost operation panel side key hole 24a and the middle operation panel side key hole 24b are formed in a circular shape in a plan view. The rearmost operation panel side key hole 24c is formed in a rectangular shape in a plan view. On an upper face of the operation panel frame 17, an annular-shaped fitting projection 25a as the operation panel side engaging portion is provided around the foremost operation panel side key hole 24a. A linear-shaped fitting projection 25c extending in the front-back direction, as the operation panel side engaging portion, is provided on left and right sides of the rearmost operation panel side key hole 24c. No fitting projection is provided around the middle operation panel side key hole 24b.

As shown in FIG. 6, switches 26a to 26c are provided to be projected from the upper face of the substrate 18. The switches 26a to 26c are arrayed in the front-back direction at predetermined intervals. The foremost switch 26a and the middle switch 26b are provided substantially at a center in a transverse direction of the substrate 18. As shown in FIG. 7, the rearmost switch 26c is provided on a left side of the substrate 18. On the right side of the rearmost switch 26c, an LED 27 is provided substantially at the center in the transverse direction of the substrate 18.

The substrate 18 is electrically connected to electrical components (for example, power substrate) housed in the printer main body 2 via a flat cable 30 (see FIG. 8) and a connector (not illustrated). The flat cable 30 is provided at a position covered by the upper covering 6 (see FIGS. 1 and 2).

The keys 20a to 20c are of a push-button type and arrayed in the front-back direction at predetermined intervals. The start key 20a, which is the foremost key, is used for restarting the printer 1 after maintenance, for example. The start key 20a is formed in a round shape in a plan view. The cancel key 20b, which is the middle key, is used for stopping printing, for example. The cancel key 20b is formed in a round shape in a plan view. The energy saving mode key 20c, which is the rearmost key, is used for performing low-speed printing (energy saving printing), for example. The energy saving mode key 20c is formed in a rectangular shape in a plan view. In the present embodiment, when the energy saving mode key 20c is turned on, the LED 27 is lit.

As shown in FIGS. 6 and 7, legs 31a to 31c are respectively provided at lower faces of the keys 20a to 20c. When the keys 20a to 20c are pressed, the legs 31a to 31c are brought into contact with the upper face of the substrate 18 to thereby prevent excessive pressure from being applied to the keys 20a to 20c. The keys 20a to 20c are respectively provided with pressing portions 32a to 32c at positions corresponding to the switches 26a to 26c on the substrate 18. When the keys 20a to 20c are pressed, the pressing portions 32a to 32c correspondingly press the switches 26a to 26c, respectively. The switches 26a to 26c are thus turned on.

The keys 20a to 20c are inserted into the operation panel side key holes 24a to 24c of the operation panel frame 17 with an allowance. The fitting projection 25a is provided around the start key 20a. The fitting projection 25c is provided on left and right sides of the energy saving mode key 20c (see FIG. 5). The keys 20a to 20c are inserted into the covering side key holes 13a to 13c of the upper covering 6 with an allowance. The keys 20a to 20c are exposed to the upper face of the upper covering 6 through the covering side key holes 13a to 13c (see FIG. 1). As a result, a user can operate the keys 20a to 20c by pressing in a state in which the upper covering 6 is attached to the printer main body 2. In the present embodiment, the allowance around the keys 20a to 20c inserted into the operation panel side key holes 24a to 24c (see arrow β in FIG. 6) is greater than the allowance around the keys 20a to 20c inserted into the covering side key holes 13a to 13c (see arrow α in FIG. 6).

An example of an assembly procedure of the printer 1 thus configured is described hereinafter.

First, as shown in FIG. 9, the operation panel unit 16 is attached to the printer main body 2 by engaging the hooks 21a and 21b with the engaging holes 23a and 23b. As described above, the width in the front-back direction and a width in a transverse direction of the engaging holes 23a, 23b are greater than those of the hooks 21a, 21b. In a case in which the hooks 21a and 21b are engaged with the engaging holes 23a and 23b, the operation panel unit 16 can slide in a front-back direction and a transverse direction within predetermined ranges with respect to the printer main body 2. The operation panel unit 16 is not completely positioned with respect to the printer main body 2. The operation panel unit 16 is attached to the printer main body 2 in such a way that the operation panel unit 16 can slide with respect to the printer main body 2 in a direction intersecting an attaching direction (vertical direction in the present embodiment) of the outer covering 6 to the printer main body 2. Wiring between the operation panel unit 16 and an electrical component in the printer main body 2 is performed in this state.

And then, the upper covering 6 is attached to the printer main body 2 from above. While the upper covering 6 is being attached, the fitting projection 15a on a front end of the upper covering 6 fits into the fitting projection 25a on a front end of the operation panel unit 16 as shown in FIG. 6. In addition, the fitting projection 15c on a rear end of the upper covering 6 fits into the fitting projection 25c on a rear end of the operation panel unit 16 as shown in FIG. 7. The fit between the fitting projections 15a and 15c of the upper covering 6 and the fitting projections 25a and 25c of the operation panel unit 16 restricts slide of the operation panel unit 16 in the front-back direction and the transverse direction. The operation panel unit 16 is thus positioned and fixed with respect to the upper covering 6. The assembly of the printer 1 is thus completed.

In the present embodiment, as described above, the upper covering 6 is attached to the printer main body 2 in a state in which the operation panel unit 16 is attached to the printer main body 2. This allows the upper covering 6 to be attached to the printer main body 2 after completion of wiring between the operation panel unit 16 and the electrical component in the main body 2. Therefore, it is possible to prevent disturbance of the wiring by the upper covering 6 and to facilitate the wiring and assembly.

In other words, the outer covering (upper covering) 6 is attached to the main body (printer main body) 2 in a state in which the operation panel unit 16 is attached to the main body 2. This allows an assembly procedure in which the outer covering 6 is attached to the main body 2 after completion of wiring between the operation panel unit 16 and the electrical component on the main body 2 side. Therefore, it is possible to prevent disturbance of the wiring by the outer covering 6 and also to facilitate the wiring and assembly.

According to positions of fit between the fitting projections 15a and 15c and the fitting projections 25a and 25c, the operation panel unit 16 is positioned directly with respect to the upper covering 6. The positional accuracy of the operation panel unit 16 with respect to the upper covering 6 can thus be improved. Accordingly, looseness of the keys 20a to 20c can be suppressed and operability can be improved.

In other words, upon attaching the outer covering 6 to the main body 2, the operation panel unit 16 is positioned directly with respect to the outer covering 6. The positional accuracy of the operation panel unit 16 with respect to the outer covering 6 can thus be improved. Accordingly, looseness of the keys 20a to 20c can be suppressed and operability can be improved.

In addition, the upper covering 6 is attached to the printer main body 2 after completion of wiring between the operation panel unit 16 and the electrical component in the main body 2. A length of cable such as the flat cable 30 required for the wiring can thus be minimized. As a result, the manufacturing cost can be reduced.

In addition, in the present embodiment, the fitting projections 25a and 25c, as the operation panel side engaging portions, are provided on the operation panel frame 17. The stability of the operation panel side engaging portions can be improved compared to a case in which, for example, the operation panel side engaging portions are provided respectively on the keys 20a to 20c. Therefore, it is possible to infallibly fit the fitting projections 15a and 15c of the upper covering 6 into the fitting projections 25a and 25c of the operation panel unit 16.

In other words, in the present embodiment, the operation panel unit 16 is provided with the operation panel frame 17 to which the keys 20a to 20c can be attached. The operation panel frame 17 is provided with the operation panel side engaging portions (fitting projections 25a, 25c). The outer covering 6 includes the covering side engaging portions (fitting projections 15a, 15c) at positions corresponding to the operation panel side engaging portions. When the outer covering 6 is attached to the main body 2 in a state in which the operation panel unit 16 is attached to the main body 2, the operation panel side engaging portions (fitting projections 25a, 25c) engage with the covering side engaging portions (fitting projections 15a, 15c) to thereby restrict slide of the operation panel unit 16.

By employing such a configuration, the stability of the operation panel side engaging portions can be improved compared to a case in which, for example, the operation panel side engaging portions are provided respectively on the keys 20a to 20c. Therefore, it is possible to infallibly engage the covering side engaging portions (fitting projections 15a and 15c) with the operation panel side engaging portions (fitting projections 25a and 25c).

In the present embodiment, the allowance around the keys 20a to 20c inserted into the operation panel side key holes 24a to 24c is greater than the allowance around the keys 20a to 20c inserted into the covering side key holes 13a to 13c. As a result, a gap between the upper covering 6 and the keys 20a to 20c is not easily visible from the outside and appearance can be improved. In addition, trouble such as failed operation of the keys 20a to 20c is not easily caused, compared to a case in which, for example, the allowance around the keys 20a to 20c inserted into the covering side key holes 13a to 13c is the same as the allowance around the keys 20a to 20c inserted into the operation panel side key holes 24a to 24c.

In other words, in the present embodiment, the outer covering 6 is provided with the covering side key holes 13a to 13c into which the keys 20a to 20c can be inserted with an allowance. The operation panel unit 16 includes operation panel side key holes 24a to 24c into which the keys 20a to 20c can be inserted with an allowance. The covering side key holes 13a to 13c and the operation panel side key holes 24a to 24c are formed such that the allowance around the keys 20a to 20c inserted into the operation panel side key holes 24a to 24c is greater than the allowance around the keys 20a to 20c inserted into the covering side key holes 13a to 13c.

In such a configuration, a gap between the outer covering 6 and the keys 20a to 20c is not easily visible from the outside and appearance can be improved. In addition, since the allowance around the keys 20a to 20c inserted into the operation panel side key holes 24a to 24c is greater than the allowance around the keys 20a to 20c inserted into the covering side key holes 13a to 13c, trouble such as failed operation of the keys 20a to 20c is not easily caused compared to a case in which the gaps are the same as each other.

In addition, in the present embodiment, the flat cable 30 is provided at a position covered by the upper covering 6. As a result, the flat cable 30 can be prevented from being visible from the outside by a simple configuration, thereby improving appearance. In a case in which, as described above, the flat cable 30 is provided at a position covered by the upper covering 6, wiring is extremely difficult after attaching the upper covering 6 to the printer main body 2. However, in the present embodiment, an assembly procedure in which the upper covering 6 is attached to the printer main body 2 after wiring is employed as described above. Therefore, there is no problem even if the upper covering 6 covers the flat cable 30 after wiring.

In other words, in the present embodiment, the operation panel unit 16 is connected to an electrical component housed in the main body 2 via a cable (flat cable 30), which is arranged at a position covered by the outer covering 6.

In the configuration in which the outer covering 6 covers the cable (flat cable 30), the cable can be prevented from being visible from the outside by a simple configuration, thereby improving appearance. In a case in which, as described above, the cable is provided at a position covered by the outer covering 6, wiring is extremely difficult after attaching the outer covering 6 to the main body 2. However, in the present embodiment, the assembly procedure in which the outer covering 6 is attached to the main body 2 after wiring can be employed. Therefore, there is no problem even if the outer covering 6 covers the cable after wiring.

In addition, in the present embodiment, the fitting projections 25a, 25c are arranged around the foremost and rearmost keys 20a, 20c among the three keys 20a to 20c. In such a configuration, the fitting position of the fitting projections 15a and 25a and the fitting position of the fitting projections 15c and 25c can be spaced apart from each other at a maximum. As a result, positional deviation between the operation panel unit 16 and the upper covering 6 can be infallibly prevented.

In other words, in the present embodiment, a plurality of keys is aligned on the operation panel unit 16. The foremost and rearmost keys 20a, 20c among the plurality of keys 20a to 20c are provided with the operation panel side engaging portions (fitting projections 25a, 25c) therearound.

In such a configuration, positional deviation between the operation panel unit 16 and the outer covering 6 can be infallibly prevented.

Figure 10:
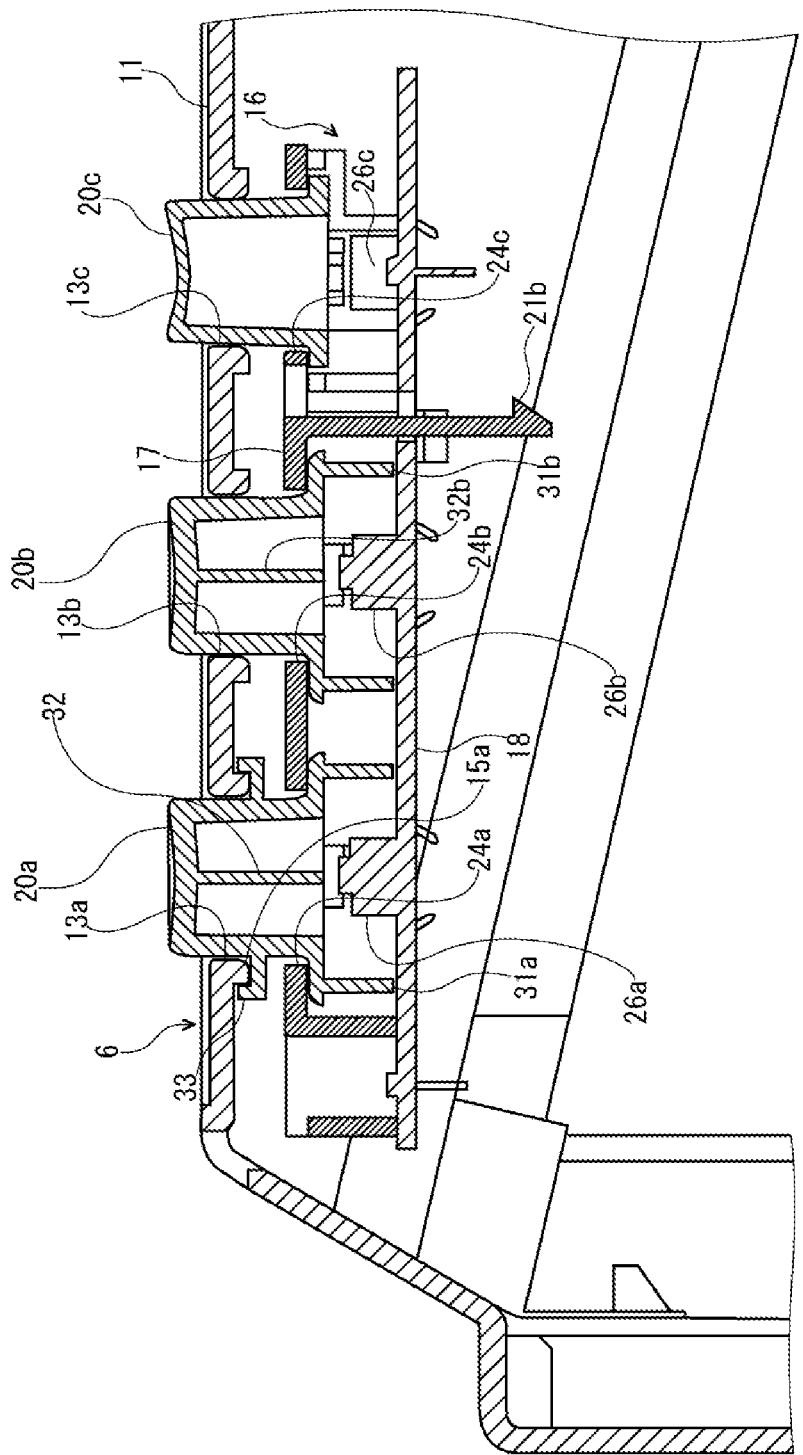
FIG. 10 is a cross-sectional view of the upper covering and the operation panel unit of the printer according to another embodiment.

In the present embodiment, a case in which the fitting projections 25a and 25c, as the operation panel side engaging portions, are provided on the operation panel frame 17 has been described; however, the present disclosure is not limited thereto. As shown in FIG. 10, a fitting projection 33 as the operation panel side engaging portion can be provided on a key, such as the start key 20a, itself. In such a configuration, the key is directly positioned with respect to the upper covering 6 and positional accuracy of the key with respect to the upper covering 6 can be improved.

In other words, in the embodiment shown in FIG. 10, the key 20a is provided with the operation panel side engaging portion (fitting projection 33) and the outer covering 6 includes the covering side engaging portion (fitting projection 15a) at positions corresponding to the operation panel side engaging portion. When the outer covering 6 is attached to the main body 2 in a state in which the operation panel unit 16 is attached to the main body 2, the operation panel side engaging portion engages with the covering side engaging portion to thereby restrict slide of the operation panel unit 16.

In such a configuration, the key is directly positioned with respect to the outer covering 6 and positional accuracy of the key with respect to the outer covering 6 can be improved.

According to the present disclosure, an attachment structure for the operation panel unit can be provided, that can improve operability by suppressing looseness of keys and can facilitate wiring and assembly.

In the present embodiment, a case in which the push-button type keys 20a to 20c, which are to be pressed, are used has been described; however, the present disclosure is not limited thereto. Other types of keys such as lever-type keys, dial-type keys to be rotated, and the like can also be used.

In the present embodiment, a case in which three keys: the start key 20a; the cancel key 20b; and the energy saving mode key 20c are provided on the operation panel unit 16 has been described; however, the present disclosure is not limited thereto. The number of keys can be changed according to functions to be provided by the electronic device.

In the present embodiment, the start key 20a and the cancel key 20b are formed in a round shape in a plan view and the energy saving mode key 20c is formed in a rectangular shape in a plan view. However, this is a mere example of shapes of the keys. For example, all the keys can be formed in a round shape in a plan view or in a polygonal shape such as a rectangular shape in a plan view.

In the present embodiment, a case in which the operation panel unit 16 is covered by the upper covering 6 is described; however, the present disclosure is not limited thereto. The operation panel unit 16 can be covered by an outer covering other than the upper covering 6, such as the left and right coverings 3, 4.

In the present embodiment, a case in which the configuration of the present disclosure is applied to the printer 1 as the image forming apparatus is described; however, the present disclosure is not limited thereto. The configuration of the present disclosure can also be applied to other image forming apparatuses such as a copy machine, facsimile machine, multifunction peripheral and the like. The configuration of the present disclosure can also be applied to an electronic device other than an image forming apparatus, such as a DVD recorder.

What is claimed is:

1. An attachment structure for an operation panel unit, comprising:
   an operation panel unit having a plurality of keys operated by a user and comprising an operation panel frame to which the plurality of keys are attachable in a row and which comprises a plurality of operation panel side projections are adjacent to an end pair of the plurality of keys which is located at both ends of the row;
   a main body to which the operation panel unit is attached; and
   an outer covering that is attached to the main body so as to cover the operation panel unit, the outer covering comprising a plurality of covering side key holes through which the plurality of keys are insertable with allowance and also comprising a plurality of covering side projections arranged adjacent to the covering side key holes, an end pair of the covering side projections corresponding to the plurality of operation panel side projections;
   wherein a first key of the end pair of the plurality of keys is configured to be substantially circular and a second key thereof is configured to be substantially rectangular, wherein a first key hole of the plurality of covering side key holes is configured to be substantially circular corresponding to the first key and a second key hole thereof is configured to be substantially rectangular corresponding to the second key, wherein a first projection of the plurality of covering side projections is configured to be substantially annular corresponding to the first key hole and a second projection thereof is configured to be in a substantially rectangular frame corresponding to the second key hole, wherein a first projection of the plurality of operation panel side projections which engages with the first projection of the plurality of covering side projections is configured to be substantially annular and a second projection thereof which engages with the second projection of the plurality of covering side projections is configured to be a pair of rectilinear members, wherein the operation panel unit is attached to the main body in such a way that the operation panel unit is slidable with respect to the main body, in a direction intersecting an attaching direction of the outer covering to the main body, and wherein, when the outer covering is attached to the main body in a state in which the operation panel unit is attached to the main body, the first projection and the second projection of the plurality of operation panel side projections engage with the first projection and the second projection of the plurality of covering side projections, such that sliding of the operation panel unit is restricted.

2. The attachment structure according to claim 1, wherein the operation panel unit includes a plurality of operation panel side key holes through each of which one of the plurality of keys is insertable with allowance, and the plurality of covering side key holes and the plurality of operation panel side key holes are formed such that the allowance for each operation panel side key hole is greater than the allowance for the respective covering side key hole.

3. The attachment structure according to claim 1, wherein the operation panel unit is connected to an electrical component housed inside the main body via a cable, and the cable is arranged at a position covered by the outer covering.

4. The attachment structure according to claim 3, wherein a substrate with a switch corresponding to the key is attached to the operation panel frame, and the cable is connected to the substrate.

5. The attachment structure according to claim 3, wherein an engagement means for attaching the operation panel unit to the main body in a state in which the operation panel unit is slidable within a limited range with respect to the main body is formed on the operation panel frame.

6. An image forming apparatus comprising the attachment structure for an operation panel unit according to claim 1.

7. The image forming apparatus according to claim 6, wherein the outer covering is an upper covering that is attached from above an upper face of the main body, and a paper ejection tray to which paper, on which an image is formed in the main body, is ejected is formed on an upper face of the upper covering.

8. The image forming apparatus according to claim 7, wherein a side covering is attached to a side face of the main body, and an insertion projection that is inserted to the inside of a lower edge of the upper covering is formed on an upper edge of the side covering.

* * * * *